United States Patent

[11] 3,567,174

[72] Inventor Garland K. Grace
 Huntsville, Ala.
[21] Appl. No. 713,634
[22] Filed Mar. 18, 1968
[45] Patented Mar. 2, 1971
[73] Assignee Thiokol Chemical Corporation
 Bristol, Pa.

[54] BREAKDOWN CORE FOR FORMING A CAVITY IN A SOLID PROPELLANT GRAIN
 1 Claim, 5 Drawing Figs.

[52] U.S. Cl..................................................... 249/186,
 18/45, 18/Rocket fuel core digest, 18/Magnet digest
[51] Int. Cl....................................................... B29c 1/00
[50] Field of Search.......................................... 18/(Rocket fuel core digest); 249/145, 152, 186, 153, 175, 178, 179, 180, 183, 184, 185

[56] References Cited
 UNITED STATES PATENTS

| | | | |
|---|---|---|---|
| 2,026,996 | 1/1936 | Raflovich................... | 18/45MX |
| 2,476,359 | 7/1949 | Disbennet................... | 249/145 |
| 2,770,013 | 11/1956 | Crooker.................. | 18/(magnet digest) |
| 2,808,621 | 10/1957 | Torrey.................... | 18/(Magnet digest) |
| 2,818,618 | 1/1958 | Winship et al. .......... | 249/186 |
| 3,270,999 | 9/1966 | Fowler et al. ............. | 18/(Rocket Core digest) |
| 3,321,807 | 5/1967 | O'Brien................... | 18/(magnet digest) |
| 3,345,438 | 10/1967 | Carey .................... | 18/(Rocket Core digest) |
| 3,439,732 | 4/1969 | Andreoli.................. | 18/(Magnet digest) |

Primary Examiner—Howard Flint, Jr.
Attorney—Thomas W. Brennan

ABSTRACT: A breakdown core for forming a cavity in a solid propellant grain, that is larger in diameter than the opening in the aft end of a rocket motor case, and wherein the core comprises a body and a plurality of vanes or fins that are selectively connected to the body by the utilization of permanent magnets.

Garland K. Grace INVENTOR.

BY

ATTORNEY

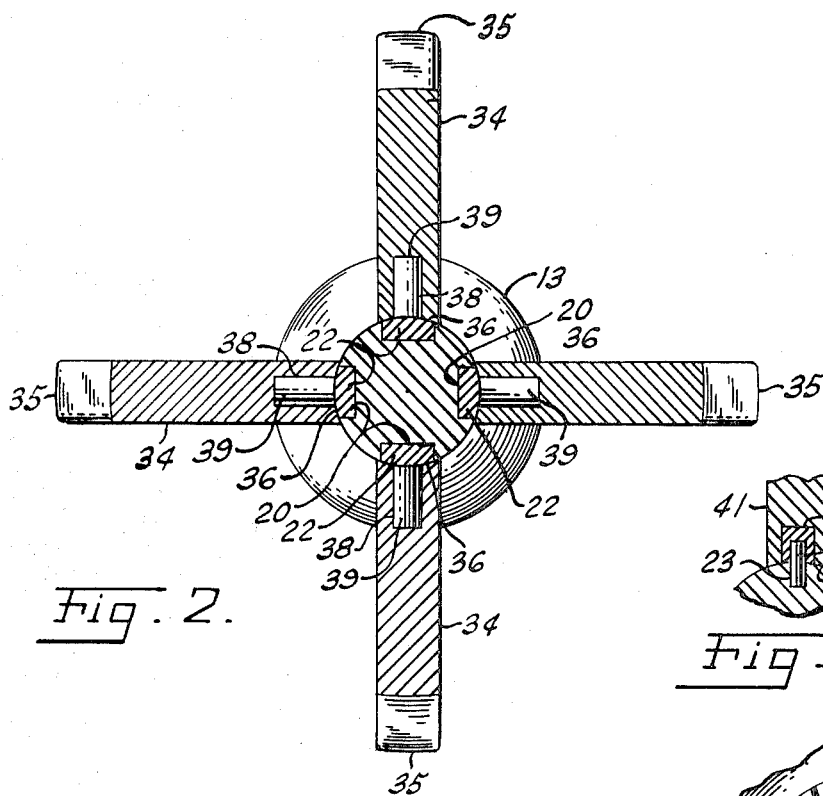
Fig. 2.
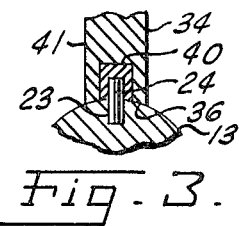
Fig. 3.
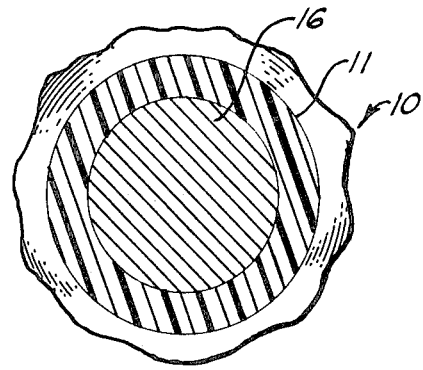
Fig. 5.
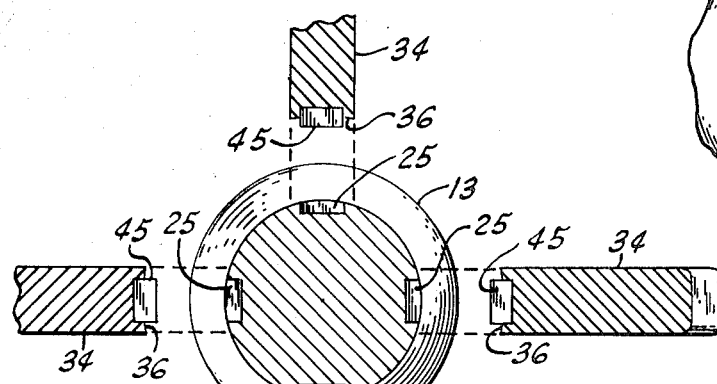
Fig. 4.
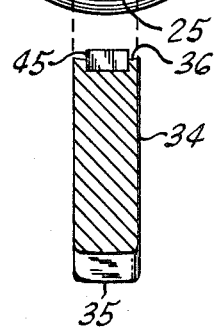

3,567,174

BREAKDOWN CORE FOR FORMING A CAVITY IN A SOLID PROPELLANT GRAIN

BACKGROUND OF THE INVENTION

1. Field of the Invention

In the past, cores that were utilized to form cavities in solid propellant grains for solid propellant rocket motors, were of a diameter that could be easily inserted into an opening in the aft end of a rocket motor case. However, as new requirements for operational achievements of the solid propellant rocket motors were made, it became apparent that the cavity that had to be formed in the solid propellant grain, would demand a diameter that would be larger than the diameter of the opening in the aft end of the rocket motor case. The solid cores, therefore, that had been utilized in the past, would in some way have to be modified, so that they could be passed through the opening in the aft end of the rocket motor case and then be able to form a cavity that was larger in diameter than the diameter of the opening in the aft end of the rocket motor case. The instant invention, therefore, that utilizes a breakdown core structure was designed so that it could be inserted into the opening in the aft end of the rocket motor case, component by component, and then have the components assembled into a rigid unitary structure inside of the rocket motor case to then be capable of forming a cavity in the solid propellant grain in the rocket motor case that was of a diameter that was larger than the opening in the aft end of the rocket motor case.

2. Description of the Prior Art

Many and various designs in segmental and collapsible cores have been used, but such cores included assemblies that required the utilization of complicated components and fastening means to retain their components in a rigid unitary structure. Such structures were expensive and required considerable time and energy to assemble the components after they had been inserted through the opening in the aft end of the rocket motor case. It became apparent, therefore, that a core was needed that required little time and energy to assemble, could be repeatedly used, and yet could be inexpensively manufactured. The breakdown core embodying the instant invention was therefore designed to meet these requirements, while at the same time being able to efficiently create a cavity that would meet operational requirements and would produce no detrimental effects during the production of the solid propellant rocket motor, with which it was to be used.

SUMMARY OF THE INVENTION

The primary object of the invention, therefore, was to provide improvements in cores that could be utilized to form a cavity in a solid propellant grain in a solid propellant rocket motor that was of a diameter that was greater than the diameter of the opening in the aft end of the rocket motor case of the solid propellant rocket motor.

The requirements to be met by such a core, were easy assembly and disassembly, possess the ability to be repeatedly used and yet have the ability to be manufactured inexpensively.

After due consideration, it was determined that permanent magnets could be utilized to connect the components of the core into a rigid unitary structure and also that such permanent magnets could be easily and quickly disconnected without damaging the permanent magnets or the components of the core.

The magnitude of the attraction of the permanent magnets for each other had to be considered, as well as the efforts that must be involved to break such attraction. After considerable study, the core embodying the instant invention was achieved and it is maintained that such core will meet the requirements of easy assembly and disassembly, repeated use and inexpensive manufacture, as well as being safe to handle.

With the above and other objects and advantages in view, that will appear to one skilled in the art, it is believed that the core embodying the invention can be reproduced through the aid of the following description when taken in conjunction with the accompanying drawings, in which:

BRIEF DESCRIPTION OF THE DRAWINGS

FIG. 2 is a sectional view, partly in elevation, that is taken on the line 2-2 of FIG. 1;

FIG. 3 is a detailed fragmentary sectional view of that area in FIG. 1 that is within the dotted circle 3;

FIG. 4 is a view similar to FIG. 2, taken on the line 4-4 of FIG. 1; and

FIG. 5 is a view similar to FIGS. 2 and 4 and taken on the line 5-5 of FIG. 1.

DESCRIPTION OF THE PREFERRED EMBODIMENTS

Figure 1:
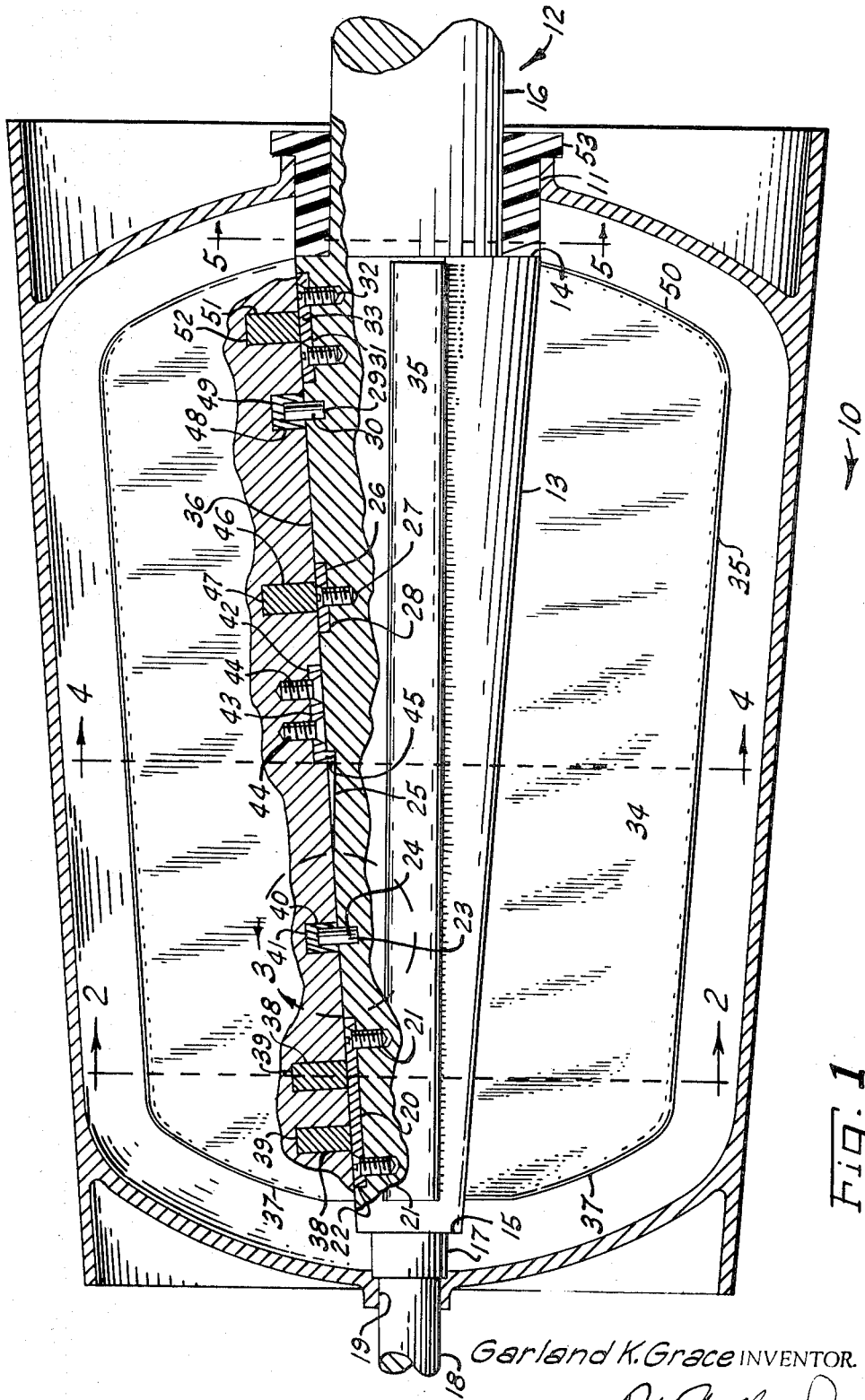
FIG. 1 is a longitudinal section of a rocket motor case, showing installed therein a core, partly in section, partly in elevation and partly broken away, embodying the invention.

Referring more in detail to the drawings, wherein like parts are designated by like reference numerals, the reference numeral 10 is utilized to generally designate a rocket motor case for a solid propellant rocket motor.

Considering FIG. 1, it will be noted that an opening 11 for the rocket motor case 10 in the aft end thereof is considerably smaller in diameter than the diameter of the interior area of the rocket motor case 10.

It is, therefore, to be understood that the core assembly 12 embodying the invention, must be capable of having its components inserted separately through the opening 11 in the aft end of the rocket motor case 10, and then have its components assembled as shown in FIG. 1, to form a cavity in a solid propellant grain that is to be cast into the rocket motor case 10.

The core assembly 12 comprises a core body 13 that has the outer circumferential surface thereof tapered longitudinally from the aft end 14 thereof to the head end 15 thereof and the diameter of the aft end 14 of the core body 13 is substantially twice the diameter of the head end 15 thereof.

The aft end 14 of the core body 13 is of a diameter that can be easily inserted into the opening 11 in the aft end of the rocket motor case 10 and a guide portion 16 for the core body 13 is formed integrally with the aft end 14 of the core body 13.

The head end 15 of the core body has a guide portion 17 therefor formed integrally therewith and a reduced extension portion 18, integral with the guide portion 17, extends through an opening 19 in the head end of the motor case 10.

Secured in sockets 20, that are provided in the outer circumferential surface of the core body 13, adjacent to the head end 15 thereof, by fastening means 21, are four radially and diametrically opposed permanent magnets 22 and spaced longitudinally aft of the permanent magnets 22, there is provided in the outer circumferential surface of the core body 13, four radially and diametrically opposed bores 23 that are in alignment with the permanent magnets 22 and each of the bores 23 is adapted to securely receive therein one end of each of four nonmetallic shear or load bearing pins 24.

Spaced longitudinally aft of the bores 23 and pins 24 in alignment therewith, the outer circumferential surface of the core body 13 is provided with four radially and diametrically opposed guide slots 25 and the bottom surface of each of the slots 25 incline inwardly from the outer circumferential surface of the core body 13 in that area thereof that is more closely adjacent to the head end 15 thereof.

Also spaced longitudinally aft of the slots 25 in the outer circumferential surface of the core body 13 are a second series of four radially and diametrically opposed sockets 26 that are also in alignment with the slots 25 and fastening means 27 secure in each of the sockets 26 a permanent magnet 28.

Further spaced longitudinally aft of the sockets 26 and the permanent magnet 28 therein, there is also provided in the outer circumferential surface of the core body 13 in alignment with the sockets 26 a second series of four radially and diametrically opposed bores 29 and each of the bores 29 is adapted to securely receive therein one end of each of four nonmetallic shear or load bearing pins 30.

Adjacent to the aft end 14 of the core body 13 and also spaced longitudinally aft of and in alignment with the bores 29 there is provided in the outer circumferential surface of the core body 13 a third series of radially and diametrically opposed sockets 31 and secured in each of the sockets 31, by fastening means 32, is a permanent magnet 33.

To complete the core assembly 12, four vanes or fins 34, that are formed from a laminated nonmetallic material, are utilized and the outer peripheral edge 35 of each of the vanes or fins 34 is contoured to compliment the configuration of the inner surface of the rocket motor case 10. Also the outer peripheral edge 35 of each of the vanes or fins 34 is spaced from the interior surface of the rocket motor case 10, as required to meet the web thickness of the solid propellant grain that is desired to be achieved when the solid propellant grain is cast into the rocket motor case 10. It is also to be noted that the inner peripheral edge 36 of each of the vanes or fins 34 is contoured to compliment the taper and curvature of the outer circumferential surface of the core body 13.

Each of the vanes or fins 34 have provided in the inner peripheral edge 36 thereof, adjacent the fore end 37 thereof, a pair of longitudinally spaced and aligned round apertures 38 and press fit into each of the round apertures 38 is a permanent magnet 39 and the pole of each of the permanent magnets 39 is so arranged that will be attracted to the permanent magnets 22.

Spaced longitudinally aft of the round apertures 38 and the permanent magnets 39 therein, each of the vanes or fins 34 has provided in the inner peripheral edge 36 thereof, a circular hole 40 and a cup-shaped keeper 41 is press fit into each of the circular holes 40 and the opposite ends of the shear or load bearing pins 24 are adapted to be securely received in the cup-shaped keepers 41.

Each of the vanes or fins 34 in the inner peripheral edge 36 thereof is provided with a cavity 42 which is longitudinally spaced aft of and in alignment with the circular hole 40 and the cup-shaped keeper 41 therein and a guide catch 43 is secured in the cavity 42 by fastening means 44. The guide catch is so arranged that the tongue 45 thereon will be able to be engaged in any of the slots 25 in the outer circumferential surface of the core body 13.

Spaced longitudinally aft of the cavity 42, there is provided in the inner peripheral edge 36 of each of the vanes or fins 34, a third round aperture 46 and a third permanent magnet 47 is press fit into the third round aperture 46 which is also in alignment with the cavity 42 and the pole of the permanent magnet 47 is so arranged that it will be attracted to the permanent magnet 28. Also longitudinally spaced aft of the round aperture 46, there is provided in the inner peripheral edge 36 of each of the vanes or fins 34, in alignment with the third round aperture 46, a second circular hole 48 and a second cup-shaped keeper 49 is press fit into the circular hole 48 and the opposite ends of the shear or load bearing pins 30 are adapted to be securely received into the cup-shaped keeper 49 in the inner peripheral edge 36 of each of the vanes or fins 34.

Adjacent the aft end 50 of each of the vanes or fins 34, there is provided in the inner peripheral edge 36 of each of the vanes or fins 34, a fourth round aperture 51, which is in alignment with the second circular hole 48 and a fourth permanent magnet 52 is press fit into the fourth round aperture 51 and the pole of the permanent magnet 52 is so arranged that it will be attracted to the permanent magnet 33.

For the purpose of illustrating the invention so that there will be a clear understanding of the manner of construction of the core assembly 12, only a certain number of permanent magnets and shear or load-bearing pins have been described, but it is to be understood that depending on the size of the rocket motor case 10, the number described may be increased or decreased, depending upon efficient operation of the core assembly 12, without departing from the spirit of the invention, as herein described.

In the use of the core assembly 12, it is the usual practice to position the rocket motor case 10 in a suitable support, whereby it is retained in a rigid position until the solid propellant grain is cast therein. Therefore, with this in mind the vanes or fins 34 are individually inserted through the opening 11 in the aft end of the rocket motor case 10 and positioned by suitable instruments that position the vanes or fins 34 within the interior of the rocket motor case 10 so that the core body 13 can be lowered and positioned in the rocket motor case 10 so that the components of the core assembly 12 can be properly mated with each other to provide a unitary structure.

Suitable hoisting apparatus is utilized to insert the core body 13 into the rocket motor case 10 and before the core body 13 is inserted, a spacing member 53, that is made of an elastomeric material, is placed on the guide portion 16 of the core body 13 in a position where it will not interfere with the operators in their manipulation of the components of the core assembly 12.

The extension 18 on the guide portion 17 is inserted into the opening 19 in the head of the rocket motor case 10 and the hoisting apparatus will retain the core body 13 in proper relation to the interior of the rocket motor case 12. The vanes or fins 34 are then moved into position, so that the shear or load bearing pins 30 are in proper position and the tongues 45 of the catches 43 have been received in the slots 25. The permanent magnets will then be attracted to each other and will retain the vanes or fins 34 in proper position and relation to the core body 13.

The solid propellant grain is then case into the rocket motor case 10 and after the casting operation, the spacing member 53 is moved into position, as shown in FIG. 1 and will prevent movement of the core assembly 12 during the curing of the solid propellant grain within the rocket motor case 10. After the solid propellant grain has been cured, the spacer 53 may or may not be removed, as desired, but the core body 13 is manipulated to break the shear or load bearing pins and remove the tongues 45 of the catches 43, so that the core body 13 can be removed outwardly of the rocket motor case 10.

The vanes or fins 34 are then moved out of the cavities they have formed in the solid propellant grain to a position in the center of the overall cavity until the vanes or fins 34 can be removed from the rocket motor case 10, through the opening 11 in the aft end thereof. After the last of the vanes or fins 34 have been removed, the solid propellant rocket motor is in condition for operation requirements.

The invention, therefore, utilizes a core assembly 12 that has no moving parts, as in prior core assemblies. The core body 13 and vanes or fins 34 can be used repeatedly and the core construction is simple and inexpensive to manufacture. The core assembly 12 is not easily contaminated during the casting of the solid propellant grain, a great safety factor that must be considered when core assemblies are used in casing a solid propellant grain.

The main feature of the core assembly 12, embodying the invention, is the fact that it is especially adapted to be used with solid propellant rocket motors when the opening in the aft end of the rocket motor case is of a diameter that is smaller than the diameter of the cavity that is to be formed in the solid propellant grain.

It is believed that from the foregoing description, the construction and mode of operation of the core assembly embodying the invention will be clear to one skilled in the art and it is to be understood that variations in such construction and mode of operation may be adhered to providing such variations fall within the spirit of the invention and the scope of the appended claims.

I claim:

1. A breakdown core assembly for use in forming a cavity in a solid propellant grain in a solid propellant rocket motor comprising a core body and a plurality of fins for attachment to said core body, the outer surface of said core body and one outer edge of said fins having permanent magnets mounted therein with the poles of said permanent magnets so arranged that they are in attracting relation to each other for attaching said core body to said fins, cup-shaped keepers mounted in said fins and nonmetallic load-bearing pins receivable in said cup-shaped keepers for guiding said fins into position for the attachment thereof to said core body, a latch having a tongue thereon mounted on said fins, a slot in said core body for receiving and retaining therein the tongue on said latch for retaining said core body and said fins in attached position, guide portions of reduced diameter formed integral with the opposite ends of said core body, one of said guide portions having an extension of reduced diameter integral therewith and a space member positioned on the other of said guide portions for retaining said core body and said fins in vertical alignment during the forming of said cavity.